July 5, 1949.  R. G. CLARK  2,474,932
PORTABLE CHICKEN HOUSE AND YARD
Original Filed Feb. 9, 1940  2 Sheets-Sheet 1
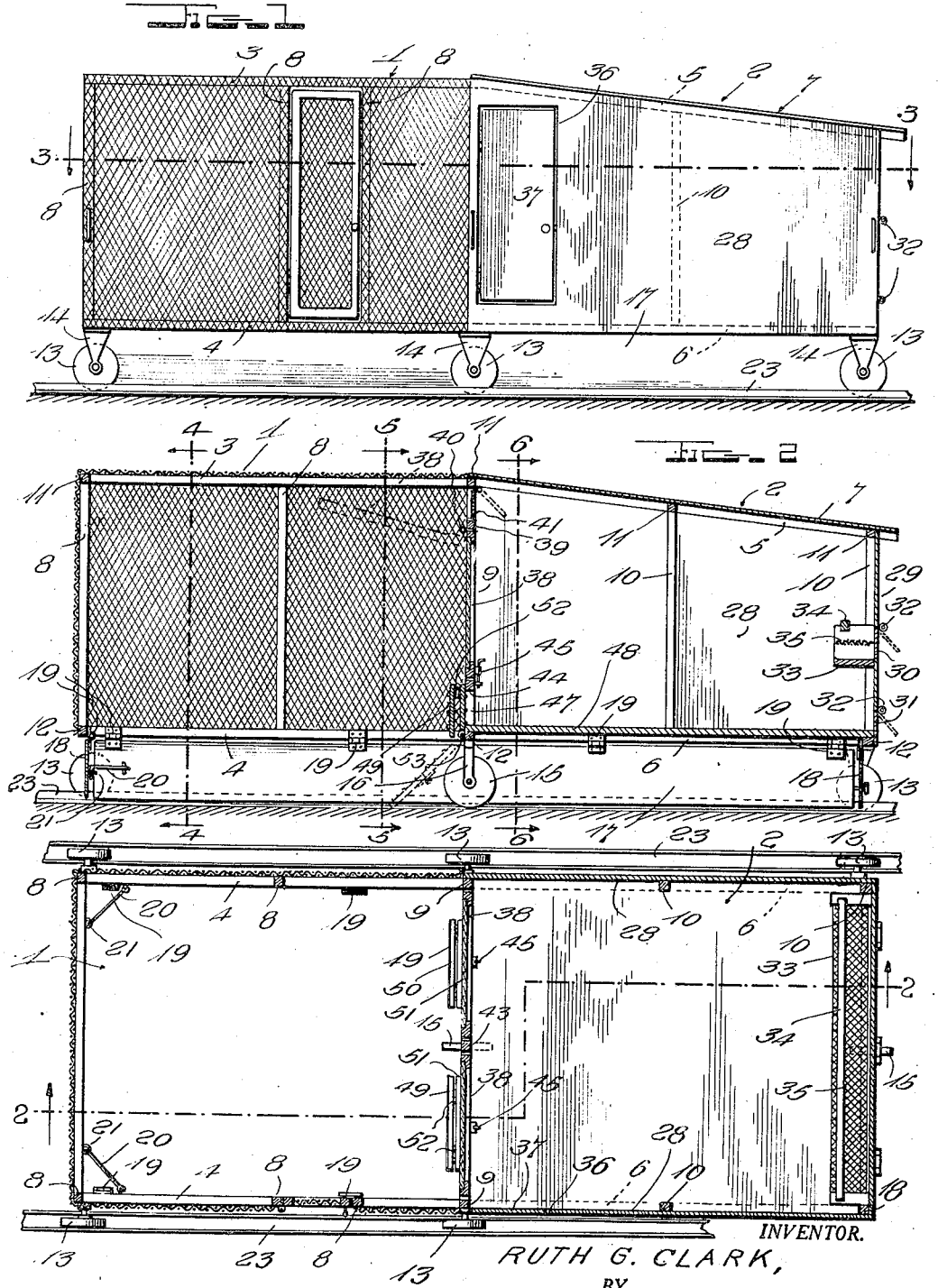
INVENTOR.
RUTH G. CLARK,

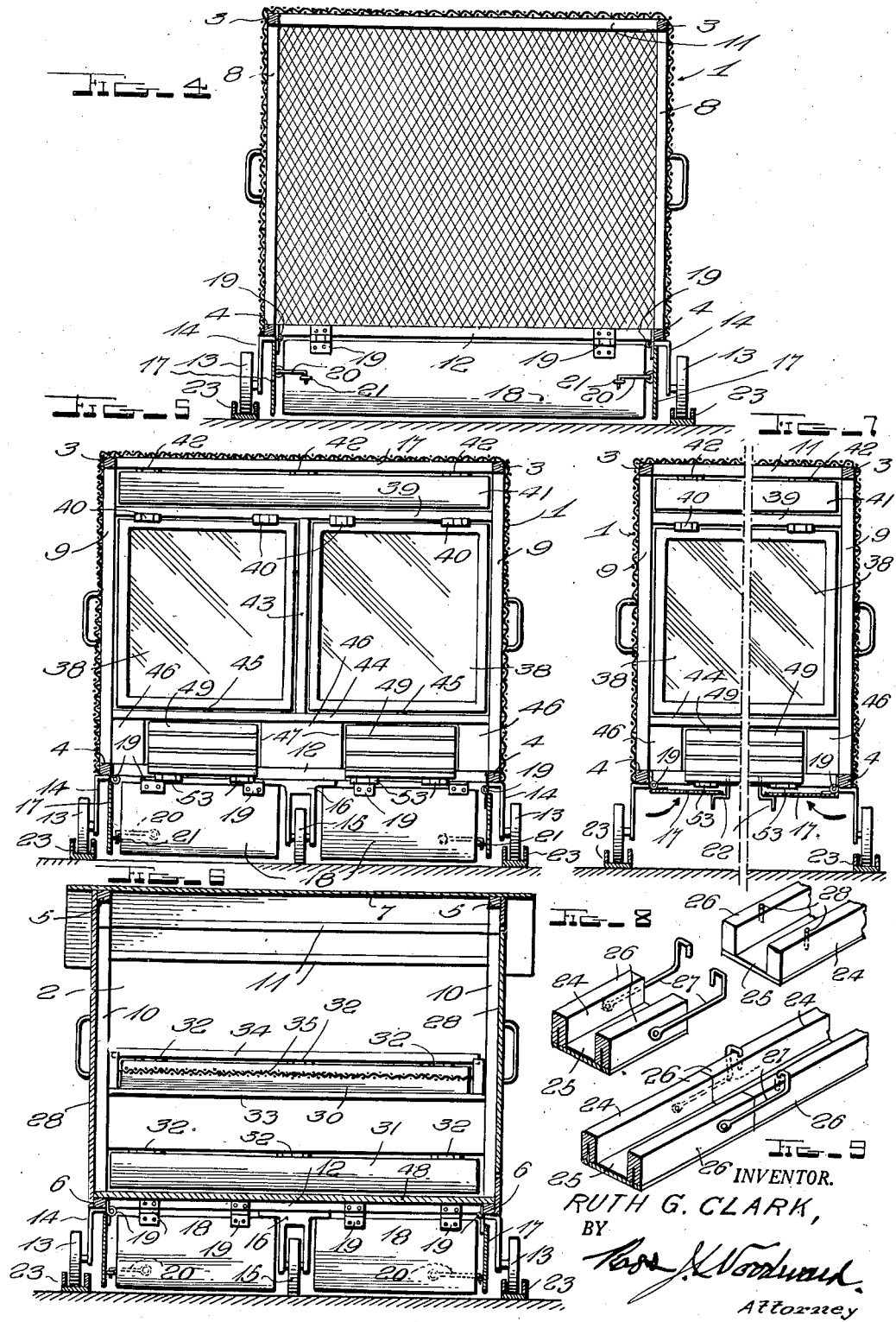

Patented July 5, 1949

2,474,932

UNITED STATES PATENT OFFICE 2,474,932

PORTABLE CHICKEN HOUSE AND YARD

Ruth G. Clark, Oakland, Calif.

Substituted for application Serial No. 318,144, February 9, 1940. This application November 5, 1948, Serial No. 58,521

1 Claim. (Cl. 119—21)

This invention relates to a portable chicken house and yard and the present application is a substitute of an application for patent filed Feb. 9, 1940, Ser. No. 318,144, now abandoned.

When a chicken house and yard are first erected, chickens remain in a healthy state but it has been found that after the first year, and often after a shorter period of time, the chickens become sickly, contract various diseases to which they are subject, and the like.

This is due to the fact that the ground under the house and within the yard becomes foul and sour and constitutes a breeding ground for worms, germs, and other bacteria which attack the healthy chickens, especially small ones, and cause them to become sick.

Therefore, it is one object of the invention to provide a house and yard which can be erected for use in a selected location and very easily moved to another location when the ground within the yard and under the house has become sour or foul. It will thus be seen that when found necessary, the house and yard may be moved to another location, where the ground is fresh and the ground of the previous location treated and given time to recover its original healthy state before being again used.

Another object of the invention is to provide the house and yard with side boards so mounted that they may be moved from a lowered ground-engaging position along sides and ends of the house and yard to a raised position where they will not interfere with movement of the house and yard from one site to another. It will thus be seen that the house and yard may be easily shifted to a new location and the side boards then lowered to operative positions where they will serve as guards to prevent dogs, cats, and other animals from entering the yard and killing chickens.

Another object of the invention is to provide tracks formed in sections, certain of the track sections constituting base members for the house and yard and others being set in place in end to end engagement with each other when the house and yard are to be rolled along the tracks to another location.

Another object of the invention is to so locate the side boards and the wheels employed that the side boards will be located inwardly of the wheels and the tracks upon which said wheels rest, thus permitting the side board to be easily swung vertically to raised or lowered position and also causing the wheels and tracks to be located outside the yard when the side boards are lowered and the house and yard are in position for use.

Another object of the invention is to provide the house with a front wall including windows and an upper ventilator movable into and out of closed position, there also being entrance openings in the lower portion of the front wall having closures serving as gangways for the entrance when swung downwardly to open position.

Another object of the invention is to provide the house with clean-cut openings at its back normally closed by boards which are so mounted that they may be swung outwardly and upwardly to open position.

Another object of the invention is to provide the house and yard with doorways through which a person may enter the yard and house, the doorways being normally closed by doors hingedly mounted.

The invention is illustrated in the accompanying drawings, wherein:

Fig. 1 is a side elevation of the house and yard.

Fig. 2 is a vertical sectional view taken longitudinally through the same on the line 2—2 of Fig. 3.

Fig. 3 is a horizontal sectional view on the line 3—3 of Fig. 1.

Fig. 4 is a vertical sectional view taken transversely through the yard on the line 4—4 of Fig. 2.

Fig. 5 is a sectional view on the line 5—5 of Fig. 2.

Fig. 6 is a sectional view taken transversely through the house on the line 6—6 of Fig. 2.

Fig. 7 is a vertical sectional view taken transversely through the yard and showing the side boards in raised position.

Fig. 8 is a perspective view of two of the track sections separated.

Fig. 9 is a perspective view showing the track sections connected in end to end relation to each other.

The yard, indicated in general by the numeral 1, extends forwardly from the house 2 and encloses a runway having its rear portion extending under the house so that chickens, particularly small chickens, may take shelter under the house during inclement weather. The upper and lower side bars 3 and 4 of the yard preferably formed continuations of the upper and lower side bars 5 and 6 of the house but may be formed separately therefrom, if desired, and it should be noted that the bars 5 extend rearwardly at a downward incline so that the roof 7 of the house will slope forwardly for proper drainage of water during rainy weather. Standards 8, 9 and 10 extend vertically between the upper and lower bars and there have also been provided upper and lower cross bars 11 and 12 secured at their ends to the side bars. It will thus be seen that the house and yard have a unitary frame and may be moved as a unit from one place to another when change of location is necessary.

In order to support the house and yard spaced upwardly from the ground and permit easy movement thereof to a new location, there have been provided wheels 13 carried by brackets 14 which are secured to the side bars and located at corners of the house and yard where they are preferably pivotally mounted so that the house and yard may be turned easily when they are to be moved, in case the new location is not directly ahead of or in back of the position from which they are to be moved. Other wheels, 15, carried by brackets 16 are located midway the width of the house. The house and yard are spaced upwardly from the ground an appreciable distance and, in order to prevent dogs, cats and other animals from entering under the house and yard, there have been provided guards 17 and 18 along sides and ends of the house and yard. These guards or boards are connected along their upper edges to the side bars and the front and rear cross bars by hinges 19 and hooks 20 are provided for entering eyes 21 and securely but releasably holding the boards in lowered position where they serve very effectively to prevent animals from entering the runway and killing the chickens. When the hooks are released, the boards may be swung upwardly to folded position and releasably secured by fasteners 22, and the house and yard then rolled to another location. The wheels 15 rest upon base members or tracks 23 consisting of a number of sections 24. These track sections are of trough-like formation and each has a bottom 25 and side strips 26 which prevent the wheels from moving transversely off of the tracks. Hooks 27 are pivoted to the side strips at one end of each track section and at its other end the side strips of each track section are formed with sockets 28 to receive the hooks of an adjoining track section and securely but detachably hold the track sections in end to end engagement with each other. Since the wheels rest upon tracks when the house and yard are in a desired location, the wheels will not become embedded in the ground. When it is desired to move the yard and house, other track sections are mounted in alignment with track sections already in place and the house and yard can then be very easily rolled along the tracks to the new location, it being understood that after the house and yard have been rolled along the tracks a certain distance, track sections over which the wheels have moved may be detached and transferred to ends of the track sections upon which the wheels rest for further movement of the house and yard.

The house 2 has side walls 28 which may be formed of sheet material, boards, or the like, and the rear wall 29 is formed of similar material. It should be noted, however, that the rear wall has horizontally extending sections 30 and 31 constituting closures which are mounted by hinges 32 for swinging movement outwardly and upwardly to open position permitting access to a shelf 33 under a perch 34 to clean the shelf of droppings which pass through the screen 35 and also allowing dirt to be swept from the floor through the opening normally closed by the door or closure 31. A doorway 36 is formed through one side wall and normally closed by a door 37 which is hinged along one side in order that it may be opened or closed.

The front wall of the house is formed as shown in Figs. 2, 3 and 5. Referring to these figures, it will be seen that the front wall has sections formed as windows 38 which have their upper ends connected with a cross bar 39 by hinges 40 so that the windows may be swung outwardly and upwardly to open position indicated by dotted lines in Fig. 2, when so desired, during warm weather, and allow air and light to enter the house. The cross bar 39 is spaced downwardly from the upper ends of the posts or standards 9, and between the bar 39 and the cross bar carried by posts 9, is a transom 41 mounted at its upper edge by hinges 42, so that it may be swung inwardly and upwardly to open position. A bar 43 extends vertically between the windows 38 with its upper end secured to the bar 39 and its lower end secured to a cross bar 44 carrying keepers for engagement by latches 45 by means of which the windows 38 are held closed. Under the cross bar 45 are wall sections 46 spaced from each other to provide entrances 47 through which chickens may enter and leave the house. These entrances are flush with the floor 48 of the house and, in order that chickens may easily enter and leave the house through these entrances, there have been provided runways 49. The runways consist of companion sections 50 and 51 connected by hinges 52, and since the sections 51 are mounted by hinges 53, the runways may be swung upwardly from the lowered position indicated by dotted lines in Fig. 2, to raised position, in which position they constitute doors or closures for the entrances 47.

Having thus described the invention, what is claimed is:

In a portable chicken house and yard, a house, an enclosure extending from said house and defining a yard, wheeled members extending downwardly from the house and enclosure and supporting same for movement from one location to another, guards extending along marginal portions of the house and enclosure and pivoted at their upper edges for swinging movement downwardly and outwardly from raised position under the house and within the enclosure to lowered position for use with the wheeled members disposed externally of the guards, and means for releasably securing the guards in lowered position.

RUTH G. CLARK.

No references cited.